(12) United States Patent
Hada et al.

(10) Patent No.: US 11,768,411 B2
(45) Date of Patent: *Sep. 26, 2023

(54) DISPLAY, DISPLAY SYSTEM, IMAGE PROJECTION SYSTEM, AND MOVABLE OBJECT

(71) Applicant: PANASONIC INTELLECTUAL PROPERTY MANAGEMENT CO., LTD., Osaka (JP)

(72) Inventors: Takato Hada, Osaka (JP); Takahiro Akiyoshi, Fukui (JP); Hiroki Hara, Osaka (JP); Keiji Sugiyama, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/748,571

(22) Filed: May 19, 2022

(65) Prior Publication Data

US 2022/0276521 A1 Sep. 1, 2022

Related U.S. Application Data

(63) Continuation of application No. 17/666,184, filed on Feb. 7, 2022, which is a continuation of application (Continued)

(30) Foreign Application Priority Data

Jun. 29, 2018 (JP) ................................. 2018-125448

(51) Int. Cl.
G02F 1/13 (2006.01)
G02F 1/1347 (2006.01)
(Continued)

(52) U.S. Cl.
CPC ....... *G02F 1/1347* (2013.01); *G02B 27/0101* (2013.01); *G02F 1/133382* (2013.01);
(Continued)

(58) Field of Classification Search
CPC ............... G02B 27/01; G02B 27/0101; G02B 27/0103; G02B 7/008; G02B 7/02;
(Continued)

(56) References Cited

U.S. PATENT DOCUMENTS 5,757,443 A 5/1998 Kobayashi
5,875,013 A 2/1999 Hiroshi
(Continued)

FOREIGN PATENT DOCUMENTS

CN 103968300 8/2014
JP 02-078926 6/1990
(Continued)

OTHER PUBLICATIONS

Office Action in Japanese patent application No. 2018-125448 dated Nov. 30, 2021, along with English-language translation.

*Primary Examiner* — Sultan Chowdhury
(74) *Attorney, Agent, or Firm* — GREENBLUM & BERNSTEIN, P.L.C.

(57) ABSTRACT

Provided is a head-up display including a liquid-crystal panel including a display screen, a Fresnel lens which is on an opposite side of the liquid-crystal panel from the display screen, a light-diffusion structure between the liquid-crystal panel and the Fresnel lens, and a mirror that forms a virtual image corresponding to an image displayed on the display screen of the liquid-crystal panel, in a target space, where the light-diffusion structure is thinner than the Fresnel lens, and the light-diffusion structure has a thickness equal to or smaller than 300 μm.

15 Claims, 7 Drawing Sheets

Related U.S. Application Data

No. 17/094,239, filed on Nov. 10, 2020, now Pat. No. 11,275,281, which is a continuation of application No. 16/454,218, filed on Jun. 27, 2019, now Pat. No. 10,871,686.

(51) Int. Cl.
- *G02F 1/1333* (2006.01)
- *G02B 27/01* (2006.01)
- *G03B 21/16* (2006.01)

(52) U.S. Cl.
CPC ........ *G03B 21/16* (2013.01); *B60K 2370/334* (2019.05); *B60K 2370/785* (2019.05)

(58) Field of Classification Search
CPC .............. G02B 7/021; B60K 2370/334; B60K 2370/785; G02F 1/1335; G02F 1/1347; G02F 1/133382; G02F 1/133504; G02F 1/133524; G02F 1/133526; G02F 1/133602; G02F 1/133607; G03B 21/006; G03B 21/008; G03B 21/16; G03B 21/28; G03B 21/145; G03B 21/208
See application file for complete search history.

(56) References Cited

U.S. PATENT DOCUMENTS

| | | |
|---|---|---|
| 8,403,490 B2 | 3/2013 | Sugiyama et al. |
| 8,698,858 B2 | 4/2014 | Kurozuka et al. |
| 9,244,278 B2 | 1/2016 | Sugiyama et al. |
| 10,871,686 B2 | 12/2020 | Hada et al. |
| 2003/0128338 A1* | 7/2003 | Hirata .................... G03B 21/60 353/31 |
| 2005/0041177 A1 | 2/2005 | Watanabe |
| 2006/0061708 A1 | 3/2006 | Umebayashi et al. |
| 2006/0077314 A1 | 4/2006 | Li et al. |
| 2006/0092510 A1* | 5/2006 | Imafuku ................ G03B 21/10 348/E5.143 |
| 2007/0019297 A1 | 1/2007 | Stewart et al. |
| 2007/0091613 A1 | 4/2007 | Lee et al. |
| 2009/0262521 A1 | 10/2009 | Ito et al. |
| 2012/0033287 A1 | 2/2012 | Friedman et al. |
| 2012/0063116 A1 | 3/2012 | Baxter et al. |
| 2012/0147281 A1* | 6/2012 | Matsuhiro ............ G09G 3/3648 349/15 |
| 2012/0162995 A1 | 6/2012 | Levermore |
| 2013/0107146 A1 | 5/2013 | Kim et al. |
| 2013/0301263 A1 | 11/2013 | Yamanaka |
| 2015/0316765 A1 | 11/2015 | Kim et al. |
| 2015/0378069 A1 | 12/2015 | Yamamoto et al. |
| 2016/0004146 A1 | 1/2016 | Nouda et al. |
| 2016/0231565 A1 | 8/2016 | Segawa |
| 2016/0266283 A1 | 9/2016 | Segawa |
| 2016/0299342 A1 | 10/2016 | Asai |
| 2017/0184844 A1 | 6/2017 | Matsushita |
| 2017/0184870 A1 | 6/2017 | Li et al. |
| 2017/0219861 A1 | 8/2017 | Fukuoka |
| 2017/0261746 A1 | 9/2017 | Tam et al. |
| 2017/0285338 A1 | 10/2017 | Narushima et al. |
| 2019/0162959 A1 | 5/2019 | Lee et al. |
| 2019/0196187 A1 | 6/2019 | Kasazumi |
| 2019/0346713 A1 | 11/2019 | Miyake et al. |
| 2020/0026073 A1 | 1/2020 | Nambara et al. |
| 2020/0041847 A1 | 2/2020 | Kobayashi |
| 2020/0050006 A1 | 2/2020 | Kojima |
| 2020/0377021 A1 | 12/2020 | So et al. |
| 2021/0103189 A1 | 4/2021 | Hsiung et al. |
| 2022/0352347 A1 | 11/2022 | Bao et al. |
| 2022/0352597 A1 | 11/2022 | Chen et al. |

FOREIGN PATENT DOCUMENTS

| | | |
|---|---|---|
| JP | 08-095029 | 4/1996 |
| JP | 09-222583 | 8/1997 |
| JP | 2006-337753 | 12/2006 |
| JP | 2016-031457 | 3/2016 |

* cited by examiner

DISPLAY, DISPLAY SYSTEM, IMAGE PROJECTION SYSTEM, AND MOVABLE OBJECT

CROSS-REFERENCE TO RELATED APPLICATION

The present application is a continuation application of U.S. patent application Ser. No. 17/666,184, filed Feb. 7, 2022, which is a continuation of U.S. patent application Ser. No. 17/094,239, filed Nov. 10, 2020, now U.S. Pat. No. 11,275,281 issued Mar. 15, 2022, which is a continuation of U.S. patent application Ser. No. 16/454,218, filed Jun. 27, 2019, now U.S. Pat. No. 10,871,686 issued Dec. 22, 2020, which claims the benefit of Japanese Patent Application No. 2018-125448, filed Jun. 29, 2018. The disclosure of each of the above-mentioned applications is expressly incorporated herein by reference in its entirety.

TECHNICAL FIELD

The present disclosure relates to displays, display systems, image projection systems, and movable objects. In particular, the present disclosure relates to a display for displaying an image, a display system including the display, an image projection system including the display system, and a movable object including the display system.

BACKGROUND ART

JP 2016-31457 A discloses a liquid-crystal display device. The liquid-crystal display device of JP 2016-31457 A includes a liquid-crystal panel, a transparent member, and a heat sink. The liquid-crystal panel transmits light from a light source. The transparent member covers at least central parts of transmissive surfaces for light, of the liquid-crystal panel, and is in contact with at least one of the transmissive surfaces. The transparent member has thermal conductivity higher than that of the liquid-crystal panel and transmits light. The heat sink is in contact with an edge of the transparent member and has thermal conductivity higher than that of the transparent member.

In JP 2016-31457 A, heat generated at the central parts of the transmissive surfaces of the liquid-crystal panel is transferred to the heat sink through the transparent member. This may contribute to improvement of heat dissipation. However, according to JP 2016-31457 A, there may be probability of occurrence of interference of light due to contact between the transparent member (heat-transfer member) and the transmissive surface of the liquid-crystal panel. Such interference of light may cause decrease in image quality.

An object would be to propose a display, a display system, an image projection system, and a movable object capable of improving heat dissipation and uniformity and additionally improving image quality.

SUMMARY

A display of one aspect according to the present disclosure includes a liquid-crystal panel, a heat-transfer member, and a light-diffusion structure. The liquid-crystal panel includes a display screen. The heat-transfer member is light-transmissive. The heat-transfer member is on an opposite side of the liquid-crystal panel from the display screen. The light-diffusion structure is between the liquid-crystal panel and the heat-transfer member.

A display system of another aspect according to the present disclosure includes: a display; and a backlight.

An image projection system of another aspect according to the present disclosure is used as a head-up display, and includes: the display system; and a projection unit configured to form a virtual image corresponding to an image displayed on the display screen of the display system, in a target space.

A movable object of another aspect according to the present disclosure includes: the display system; and a movable object body where the display system is mounted.

DETAILED DESCRIPTION

1. Embodiments

1.1 Overview

Figure 1:
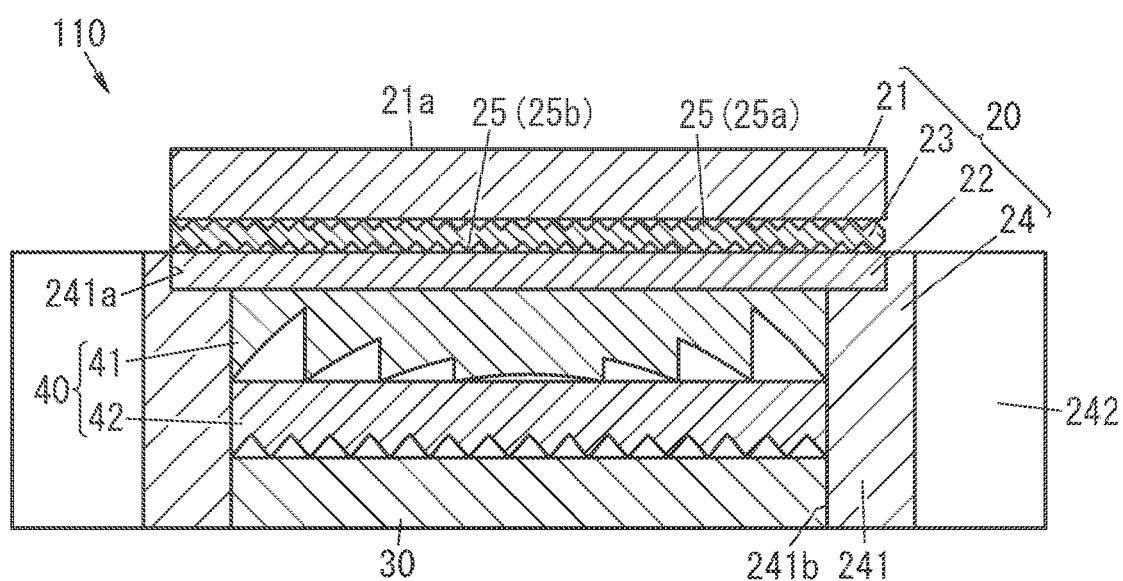
FIG. 1 is a schematic section of a display system including a display of one embodiment.

FIG. 1 is illustration of a display system 110 of one embodiment. The display system 110 includes a display 20. The display 20 includes a liquid-crystal panel 21, a heat-transfer member 22, and a light-diffusion structure 25 (25a, 25b). The liquid-crystal panel 21 includes a display screen 21a. The heat-transfer member 22 is light-transmissive. The heat-transfer member 22 is on an opposite side of the liquid-crystal panel 21 from the display screen 21a (i.e., a lower surface side in FIG. 1). The light-diffusion structure 25 is between the liquid-crystal panel 21 and the heat-transfer member 22.

The display 20 includes the heat-transfer member 22 and therefore can have improved heat-dissipation. Further, the display 20 includes the light-diffusion structure 25 and therefore can have improved uniformity (uniformity of the display screen 21a of the liquid-crystal panel 21). Furthermore, the display 20 has the light-diffusion structure 25 between the liquid-crystal panel 21 and the heat-transfer member 22 and therefore can have improved image quality. In detail, since the light-diffusion structure 25 is present between the liquid-crystal panel 21 and the heat-transfer member 22, interference of light can be reduced in a space between the liquid-crystal panel 21 and the heat-transfer member 22. It is considered the reason is that the light-diffusion structure 25 prevents close contact between the liquid-crystal panel 21 and the heat-transfer member 22 and makes a distance therebetween so that no interference of light may occur. As described above, the display 20 can improve its heat dissipation and its uniformity and further improve its image quality.

1.2 Configuration

Figure 2:
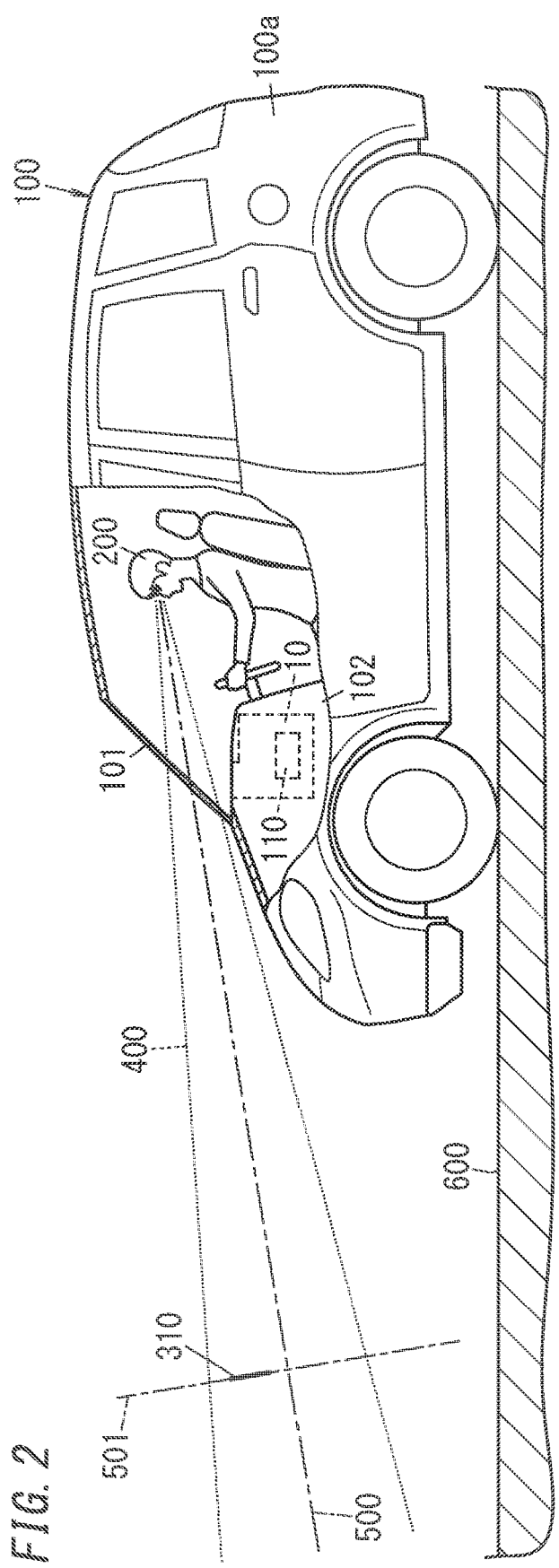
FIG. 2 is a conceptual view of a movable object (automobile) where the display system is mounted.

Hereinafter, the display 20 and the display system 110 are described in more detail. In one example, the display system 110 may be mounted on a movable object. FIG. 2 is illustration of an automobile 100 serving as the movable object. The automobile 100 includes an automotive body 100a serving as a movable object body, and the display system 110 mounted on the automotive body 10a.

Figure 4:
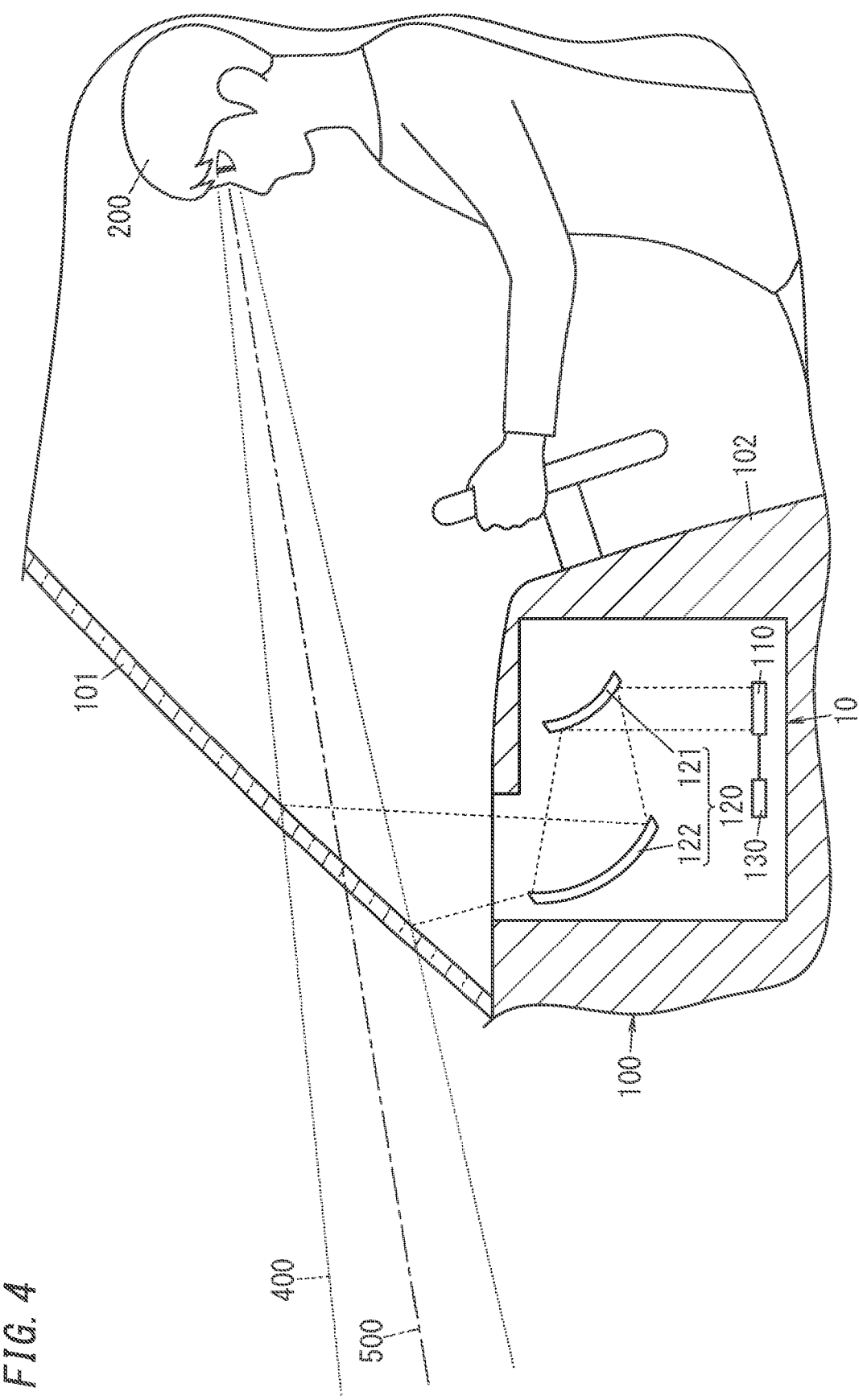
FIG. 4 is a conceptual view for illustration of the display system.

In the present embodiment, the display system 110 is used in an image projection system 10 shown in FIG. 2 and FIG. 4. The image projection system 10 is used as a head-up display (HUD) in the automobile 100.

As shown in FIG. 2, the image projection system 10 is installed in an interior of the automobile 100 to project an image onto a wind shield 101 of the automotive body (movable object body) 100a of the automobile 100 from below. In FIG. 2, the image projection system 10 is placed inside a dashboard 102 below the wind shield 101. When an image is projected from the image projection system 10 onto the wind shield 101, the image reflected from the wind shield 101 serving as a reflective member may be visually perceived by a user 200 (driver).

Figure 3:
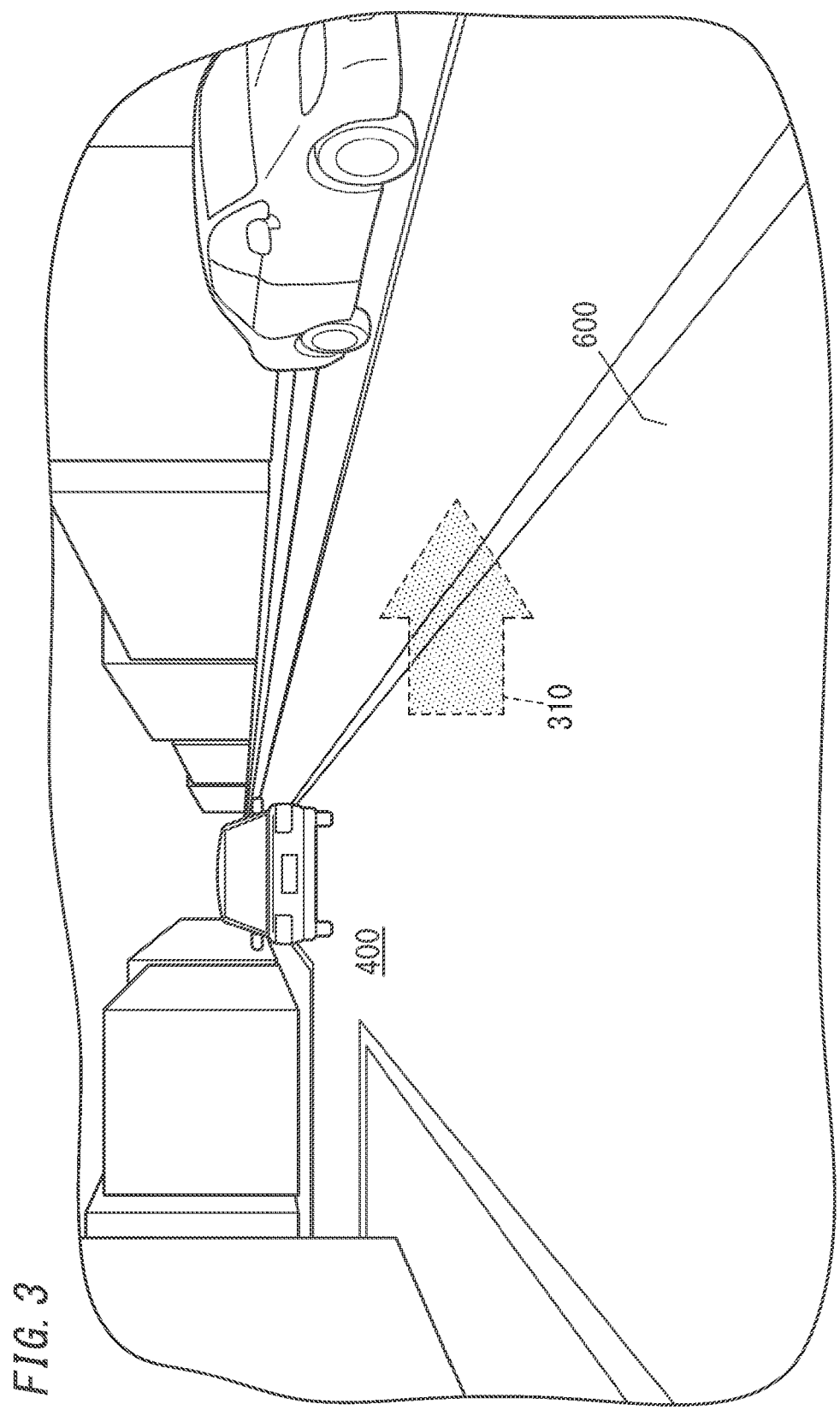
FIG. 3 is a conceptual view of a field of view of a user using the display system.

The image projection system 10 allows the user 200 to visually perceive a virtual image 310 formed in a target space 400 positioned in front of (outside) the automobile 100 over the wind shield 101. In this disclosure, a "virtual image" means an image which is formed by diffused rays of light caused when light emitted from the image projection system 10 is diffused by a reflective member such as the wind shield 101 and appears as if a real object. Therefore, as shown in FIG. 3, the user 200 driving the automobile 100 can see the virtual image 310 which is formed by the image projection system 10 and is overlaid on a real space spreading in front of the automobile 100. Accordingly, the image projection system 10 can display the virtual image 310 indicating various driving assist information such as vehicle speed information, navigation information, pedestrian information, forward vehicle information, lane departure information, and vehicle condition information, and can allow the user 200 to visually perceive it. In FIG. 3, the virtual image 310 indicates navigation information exemplified by an arrow for lane change. Accordingly, when the user 200 trains his or her eyes on a space in front of the wind shield 101, the user 200 can visually obtain the driving assist information by slight movement of a line of his or her sight.

In the image projection system 10, the virtual image 310 created in the target space 400 is present within an imaginary plane 501 across an optical axis 500 of the image projection system 10. In the present embodiment, the optical axis 500 extends along a road surface 600 in front of the automobile 100 in the target space 400 in front of the automobile 100. And, the imaginary plane 501 where the virtual image 310 is created is almost perpendicular to the road surface 600. For example, when the road surface 600 is in a horizontal plane, the virtual image 310 is displayed in a vertical plane. Note that, the imaginary plane 501 where the virtual image 310 is created may be inclined relative to the optical axis 500. An angle of the imaginary plane 501 to the optical axis 500 may not be limited particularly.

As shown in FIG. 4, the image projection system 10 includes the display system 110, a projection unit 120, and a control unit 130.

Figure 5:
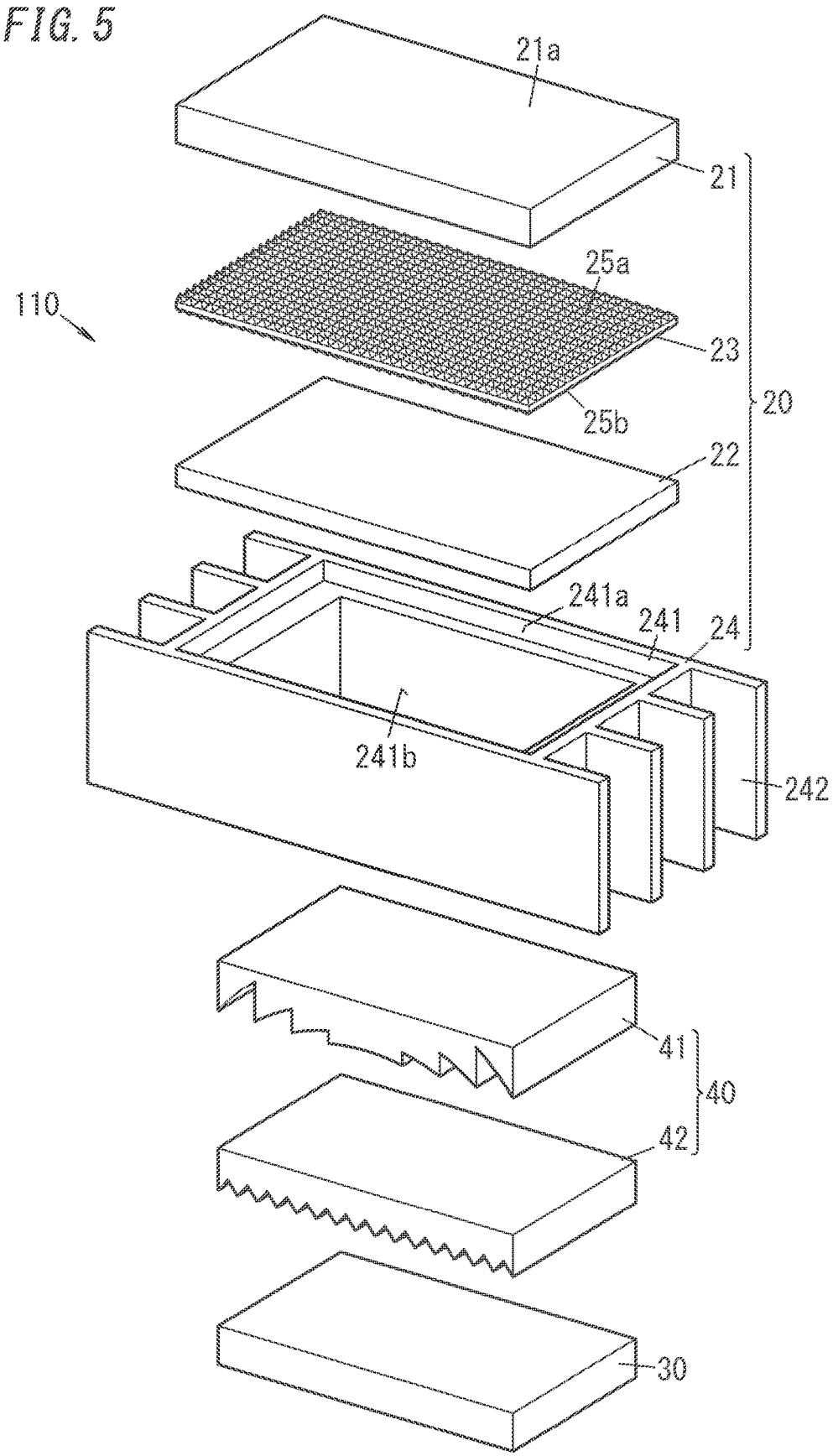
FIG. 5 is an exploded perspective view of the above display system.

The display system 110 is configured to display an image. In particular, the display system 110 is used for displaying an image which is formed in the target space 400 as the virtual image 310. As shown in FIG. 1 and FIG. 5, the display system 110 includes the display 20, a backlight 30, and an optical system 40. Note that, in FIG. 1 and FIG. 5, only for facilitating understanding explanations, dimensions of components of the display system 110 are modified accordingly.

As shown in FIG. 1 and FIG. 5, the display 20 includes the liquid-crystal panel 21, the heat-transfer member 22, a light-diffusion member 23, and a heat sink 24.

The liquid-crystal panel 21 includes the display screen 21a. The liquid-crystal panel 21 transmits light (light from the backlight 30) selectively, thereby forming an image on the display screen 21a. The liquid-crystal panel 21 has a rectangular plate shape in whole. Further, the liquid-crystal panel 21 has opposite surfaces (front and rear surfaces) which are flat. In particular, the liquid-crystal panel 21 includes the display screen 21a in its front surface. The display screen 21a is an area corresponding to part of the front surface of the liquid-crystal panel 21 which transmits light selectively (light-transmissive part). Generally, the liquid-crystal panel 21 may include components including a liquid-crystal layer, a pair of oriented films between which the liquid-crystal layer is sandwiched, a pair of transparent electrodes for applying voltages across the liquid-crystal layer, a color filter for determining colors of individual pixels, and a polarization plate for transmitting a specific component (e.g., an s-component) only. The liquid-crystal panel 21 can have a conventional structure, and therefore detailed explanation thereof may be omitted.

The heat-transfer member 22 is light-transmissive. The heat-transfer member 22 is on an opposite side of the liquid-crystal panel 21 from the display screen 21a. Purposes of providing the heat-transfer member 22 may include improvement of heat dissipation of the display 20. Especially, the heat-transfer member 22 may reduce increase in temperature of the liquid-crystal panel 21. The heat-transfer member 22 has thermal conductivity higher than thermal conductivity of the liquid-crystal panel 21. Examples of material of the heat-transfer member 22 may include normal glass, clear glass, sapphire glass, and the like. The heat-transfer member 22 has a rectangular plate shape in whole, similarly to the liquid-crystal panel 21. Additionally, the heat-transfer member 22 has opposite surfaces (front and rear surfaces) which are flat. In the present embodiment, the heat-transfer member 22 has the same size as the liquid-crystal panel 21. However, it is not necessary that the heat-transfer member 22 has the same size as the liquid-crystal panel 21. When the heat-transfer member 22 is larger than the liquid-crystal panel 21, it is sufficient that part of the heat-transfer member 22 which overlaps with the liquid-crystal panel 21 is light-transmissive.

The light-diffusion member 23 is present between the liquid-crystal panel 21 and the heat-transfer member 22. Purposes of providing the light-diffusion member 23 may include improvement of uniformity (uniformity of the display screen 21a of the liquid-crystal panel 21). The light-diffusion member 23 has a rectangular plate shape. The light-diffusion member 23 is light-transmissive. Examples of main material of the light-diffusion member 23 may include glass and resin. Note that, it is preferable that the light-diffusion member 23 does not have thermally-insulating properties. The light-diffusion member 23 is thinner than the heat-transfer member 22. Especially, in FIG. 1, the light-diffusion member 23 appears to be slightly thinner than the heat-transfer member 22. Actually, the heat-transfer member 22 has a thickness of about 2 mm but the light-diffusion member 23 has a thickness of about 100 μm.

Additionally, it is preferable that the light-diffusion member 23 has a size enough to cover the light-transmissive part of the liquid-crystal panel 21.

The light-diffusion member 23 includes two light-diffusion structures 25 (25a and 25b). One light-diffusion structure 25a is formed in an entire surface of the light-diffusion member 23 facing or closer to the liquid-crystal panel 21 (an upper surface in FIG. 1) and the other light-diffusion structure 25b is formed in an entire surface of the light-diffusion member 23 facing or closer to the heat-transfer member 22 (a lower surface in FIG. 1). The light-diffusion structures 25a and 25b have the same structure. In the present embodiment, the light-diffusion structures 25 are provided to both of the surface of the light-diffusion member 23 facing the liquid-crystal panel 21 (the upper surface in FIG. 1) and the surface of the light-diffusion member 23 facing the heat-transfer member 22 (the lower surface in FIG. 1). The light-diffusion structures 25 may be formed by mechanically processing surfaces of a substrate serving as a base of the light-diffusion member 23. Alternatively, the light-diffusion structures 25 may be formed by applying binders in which fine particles are dispersed onto the surfaces of the substrate and drying them. In this case, the light-diffusion structures 25 may include a plurality of fine particles. The structure of the light-diffusion structure 25 itself may be conventional, and therefore no detail explanation thereof is given. However, various parameters of the structure of the light-diffusion member 23 may be selected as follows. In an example, the light-diffusion member 23 may preferably have a transmittance equal to or higher than 70%. Thus, the lighting performance of the display 20 can be improved. Especially, the lighting performance of the display 20 may easily satisfy specifications required for head-up displays. Note that, the transmittance may be determined by a method defined in "Plastics—Determination of total luminous transmittance and reflectance" (JIS K 7375). The light-diffusion member 23 may preferably have haze equal to or larger than 30%. The light-diffusion member 23 may preferably have haze equal to or smaller than 90%. Thus, the lighting performance of the display 20 can be improved. Especially, the lighting performance of the display 20 may easily satisfy specifications required for head-up displays. Note that, the haze may be determined by a method defined in "Plastics—Determination of haze for transparent materials" (JIS K 7136). The light-diffusion member 23 may preferably have a thickness equal to or smaller than 300 μm. Thus, the heat dissipation of the display 20 can be improved. Note that, the thickness may be determined by a method defined in "Plastics—Film and sheeting—Determination of thickness" (JIS K 7130). In a case where the light-diffusion member 23 includes a light-diffusion structure 25 including a plurality of fine particles, an average particle size of the fine particles contained in the light-diffusion structure 25 (surface average particle size) may be preferably equal to or smaller than 20 μm. Thus, the heat dissipation of the display 20 can be improved. Note that, the average particle size may be determined by a method defined in "Particle size analysis—Image analysis methods—Part 1: Static image analysis methods" (JIS Z 8827-1).

Purposes of providing the heat sink 24 may include improvement of heat dissipation of the display 20. The heat sink 24 is thermally coupled with the heat-transfer member 22. The heat sink 24 has a thermal conductivity higher than a thermal conductivity of the heat-transfer member 22. The heat sink 24 may be made of aluminum, for example. The heat sink 24 includes a body part 241 and a plurality of fins 242. The body part 241 has a hollow rectangular prism shape. The body part 241 includes a first accommodation part 241a and a second accommodation part 241b which are coupled to each other. The first accommodation part 241a serves as a space for accommodating the heat-transfer member 22. The second accommodation part 241b is formed in a bottom surface of the first accommodation part 241a. The second accommodation part 241b is smaller than the first accommodation part 241a. Therefore, the heat-transfer member 22 may be supported on a periphery of the bottom surface of the first accommodation part 241a (a periphery of the second accommodation part 241b). As shown in FIG. 1, the second accommodation part 241b serves as a space for accommodating the backlight 30 and the optical system 40. The plurality of fins 242 have rectangular plate shapes. The plurality of fins 242 protrude from an outer surface of the body part 241.

The backlight 30 is a light source device configured to emit rays of light for forming an image on the display screen 21a of the liquid-crystal panel 21. The backlight 30 is a planer light source. Examples of light sources used in the backlight 30 may include solid light emitting devices such as light emitting diodes and laser diodes. Note that, the backlight 30 may have a conventional configuration, and therefore no detailed explanation is given.

The optical system 40 is placed between the display 20 and the backlight 30. The optical system 40 is used for converting light from the backlight 30 into light with desired properties. In the present embodiment, the optical system 40 is used for making light from the backlight 30 diverge in a desired direction (e.g., a direction perpendicular to the thickness of the liquid-crystal panel 21). The optical system 40 includes a Fresnel lens 41 and a prism sheet 42. The Fresnel lens 41 has a rectangular plate shape. The Fresnel lens 41 is made of light-transmissive material (e.g., glass or resin). The Fresnel lens 41 is situated facing the backlight 30. The Fresnel lens 41 functions as a diverging lens for allowing light from the backlight 30 to diverge in a desired direction. The prism sheet 42 has a rectangular plate shape. The prism sheet 42 is made of light-transmissive material (e.g., glass or resin). The prism sheet 42 is placed between the Fresnel lens 41 and the backlight 30. The prism sheet 42 functions as an optical device having a polarization function for directing light from the backlight 30 toward the Fresnel lens 41.

Figure 6:
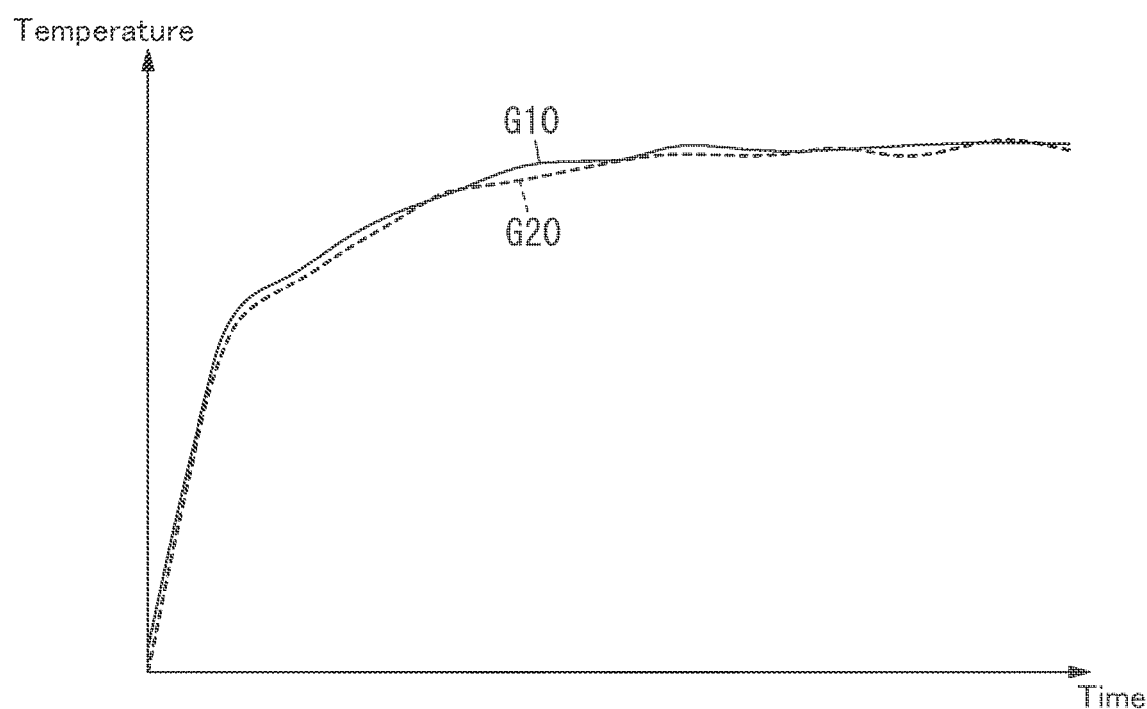
FIG. 6 is a graph showing a time variation of temperatures of the display system and a comparative example.

In the display 20, as shown in FIG. 1, the backlight 30 and the optical system 40 are accommodated in the second accommodation part 241b of the heat sink 24 of the display 20. Further, as shown in FIG. 1, the heat-transfer member 22 is accommodated in the first accommodation part 241a of the heat sink 24. The liquid-crystal panel 21 is placed on the heat-transfer member 22 with the light-diffusion member 23 in-between. Accordingly, the light-diffusion member 23 is in contact with both of the liquid-crystal panel 21 and the heat-transfer member 22, thereby thermally interconnecting them. Therefore, heat generated in the liquid-crystal panel 21 may be transferred to the heat-transfer member 22 through the light-diffusion member 23. Based on common general knowledge, there may be concern that presence of the light-diffusion member 23 between the liquid-crystal panel 21 and the heat-transfer member 22 causes decrease in heat transfer efficiency. In view of this, an experiment for confirming whether or not the light-diffusion member 23 causes decrease in the heat transfer efficiency was conducted. FIG. 6 shows results of this experiment. FIG. 6 shows a time variation of temperature of the liquid-crystal panel 21, and G10 corresponds to the display 20. In contrast, G20 corresponds to a display 20 devoid of the light-diffusion member 23. As apparent from FIG. 6, it was not confirmed that decrease in the heat transfer efficiency was caused by presence of the light-diffusion member 23 between the liquid-crystal panel 21 and the heat-transfer member 22. In other words, it was confirmed that presence of the light-diffusion member 23 between the liquid-crystal panel 21 and the heat-transfer member 22 did not give large influences on the heat transfer efficiency.

The projection unit 120 is used for forming the virtual image 310 corresponding to the image (the image displayed on the display screen 21a of the display system 110) in the target space 400. Stated differently, the projection unit 120 is configured to form, in the target space 400, the virtual image 310 corresponding to the image displayed on the display screen 21a of the liquid-crystal panel 21 of the display 20 (the image displayed on the display screen 21a of the display system 110). The projection unit 120 is configured to form the virtual image 310 in the target space 400 by reflecting rays of light constituting the image presented by the display system 110 toward a reflective member (the wind shield) 101 to project the image onto the reflective member 101. As shown in FIG. 4, the projection unit 120 includes a first optical member 121 and a second optical member 122. In other words, the projection unit 120 is an optical system constituted by the first optical member 121 and the second optical member 122.

The projection unit 120 forms the virtual image 310 corresponding to the image (the image formed on the display screen 21a of the liquid-crystal panel 21) in the target space 400, by use of rays of light passing through the liquid-crystal panel 21 of the display system 110. As shown in FIG. 4, the projection unit 120 includes the first optical member 121 and the second optical member 122. The first optical member 121 is a mirror for reflecting light from the display system 110 toward the second optical member 122. The second optical member 122 is a mirror for reflecting light from the first optical member 121 toward the wind shield 101. Accordingly, the projection unit 120 projects the image formed on the display screen 21a of the liquid-crystal panel 21 onto the wind shield 101 by use of the first optical member 121 and the second optical member 122, thereby forming the virtual image 310 in the target space 400.

The control unit 130 is configured to control the liquid-crystal panel 21 and the backlight 30 of the display system 110. The control unit 130 controls the liquid-crystal panel 21 and the backlight 30 based on an image signal given, thereby forming an image on the display screen 21a of the liquid-crystal panel 21. The control unit 130 may be implemented by a conventional control circuit for liquid-crystal displays.

1.3 Conclusion

In the display 20 as described above, the light-diffusion structure 25 is present between the liquid-crystal panel 21 and the heat-transfer member 22 and therefore the image quality can be improved. In detail, since the light-diffusion structure 25 is present between the liquid-crystal panel 21 and the heat-transfer member 22, interference of light can be reduced in a space between the liquid-crystal panel 21 and the heat-transfer member 22. It is considered the reason is that the light-diffusion structure 25 prevents close contact between the liquid-crystal panel 21 and the heat-transfer member 22 and makes a distance therebetween so that no interference of light may occur. As described above, the display 20 can improve its heat dissipation and its uniformity and further improve its image quality. In addition, the display 20 includes the light-diffusion member 23 between the liquid-crystal panel 21 and the heat-transfer member 22, but it is considered that there is no substantial influence on heat transfer between the liquid-crystal panel 21 and the heat-transfer member 22. Therefore, the uniformity and the image quality can be improved without losing the heat dissipation.

2. Variations

Embodiments of the present disclosure are not limited to the above embodiment. The above embodiment may be modified in various ways in accordance with design or the like as it can achieve the object of the present disclosure. Hereinafter, variations of the above embodiment are listed.

2.1 First Variation

Figure 7:
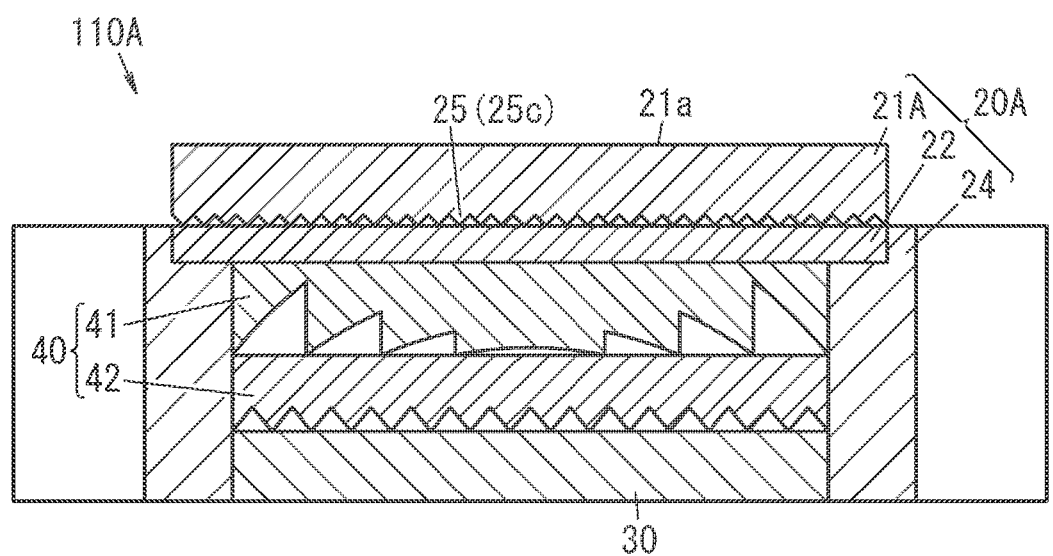
FIG. 7 is a schematic section of a display system of a first variation.

FIG. 7 is illustration of a display system 110A of a first variation. The display system 110A includes a display 20A, a backlight 30, and an optical system 40. Note that, in FIG. 7, only for facilitating understanding explanations, dimensions of components of the display system 110A are modified accordingly.

The display 20A includes a liquid-crystal panel 21A, a heat-transfer member 22, and a heat sink 24. The display 20A is different from the display 20 in that the display 20A does not include the light-diffusion member 23. Instead, the liquid-crystal panel 21A includes a light-diffusion structure 25 (25c). In more detail, the light-diffusion structure 25c is provided to an opposite surface of the liquid-crystal panel 21A from the display screen 21a (a lower surface in FIG. 7). The light-diffusion structure 25c may preferably extend to cover entire light-transmissive part of the liquid-crystal panel 21A. The light-diffusion structures 25c may be formed by mechanically processing a surface of the liquid-crystal panel 21A or by applying a binder in which fine particles are dispersed onto the liquid-crystal panel 21A. The structure of the light-diffusion structure 25c itself may be conventional, and therefore no detail explanation thereof is given.

In the display 20A, the liquid-crystal panel 21A is placed on the heat-transfer member 22 such that the light-diffusion structure 25c is directed to the heat-transfer member 22. Thus, the light-diffusion structure 25c is in contact with the heat-transfer member 22. Accordingly, the liquid-crystal panel 21A and the heat-transfer member 22 are thermally coupled with each other. Heat generated in the liquid-crystal panel 21A is transferred to the heat-transfer member 22 directly.

The display 20A includes the heat-transfer member 22 and the light-diffusion structure 25c and therefore the heat dissipation and the uniformity can be improved. Further, in the display 20A, the light-diffusion structure 25c is positioned between the liquid-crystal panel 21A and the heat-transfer member 22 and therefore the image quality can be improved. In particular, the display 20A does not require an additional part such as the light-diffusion member 23 to provide the light-diffusion structure 25c. Hence, it can be easy to provide the light-diffusion structure 25c. Additionally, in the display 20A, heat generated in the liquid-crystal panel 21A can be transferred to the heat-transfer member 22 directly. Consequently, the heat dissipation can be improved.

2.2 Second Variation

Figure 8:
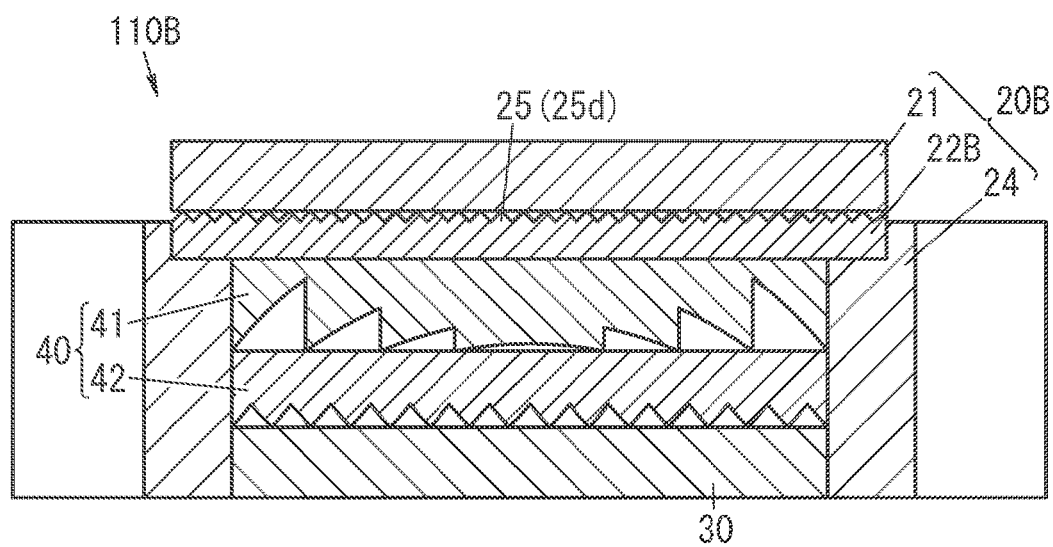
FIG. 8 is a schematic section of a display system of a second variation.

FIG. 8 is illustration of a display system 110B of a second variation. The display system 110B includes a display 20B, a backlight 30, and an optical system 40. Note that, in FIG.

8, only for facilitating understanding explanations, dimensions of components of the display system 110B are modified accordingly.

The display 20B includes a liquid-crystal panel 21, a heat-transfer member 22B, and a heat sink 24. The display 20B is different from the display 20 in that the display 20B does not include the light-diffusion member 23. Instead, the heat-transfer member 22B includes a light-diffusion structure 25 (25d). In more detail, the light-diffusion structure 25d is provided to a surface of the heat-transfer member 22B facing the liquid-crystal panel 21 (an upper surface in FIG. 8). The light-diffusion structure 25d may preferably extend to cover entire light-transmissive part of the liquid-crystal panel 21. The light-diffusion structures 25d may be formed by mechanically processing a surface of the heat-transfer member 22B or by applying a binder in which fine particles are dispersed onto the heat-transfer member 22B. The structure of the light-diffusion structure 25d itself may be conventional, and therefore no detail explanation thereof is given.

In the display 20B, the heat-transfer member 22B is placed on the heat sink 24 so that the light-diffusion structure 25d is opposite from the backlight 30. The liquid-crystal panel 21 is placed on the light-diffusion structure 25d of the heat-transfer member 22. Thus, the light-diffusion structure 25d is in contact with the liquid-crystal panel 21. Accordingly, the liquid-crystal panel 21 and the heat-transfer member 22B are thermally coupled with each other. Heat generated in the liquid-crystal panel 21 is transferred to the heat-transfer member 22B directly.

The display 20B includes the heat-transfer member 22B and the light-diffusion structure 25d and therefore the heat dissipation and the uniformity can be improved. Further, in the display 20B, the light-diffusion structure 25d is positioned between the liquid-crystal panel 21 and the heat-transfer member 22B and therefore the image quality can be improved. In particular, the display 20B does not require an additional part such as the light-diffusion member 23 to provide the light-diffusion structure 25d. Hence, it can be easy to provide the light-diffusion structure 25d. Additionally, in the display 20B, heat generated in the liquid-crystal panel 21 can be transferred to the heat-transfer member 22B directly. Consequently, the heat dissipation can be improved.

2.3 Other Variations

For example, in the display 20, the light-diffusion member 23 does not necessarily include the light-diffusion structure 25 (25a, 25b) provided to each of the surface facing the liquid-crystal panel 21 and the surface facing the heat-transfer member 22. Stated differently, the light-diffusion structure 25 may be provided to the surface of the light-diffusion member 23 facing the liquid-crystal panel 21 only. In this case, the surface of the light-diffusion member 23 facing the heat-transfer member 22 may be flat. Or, the light-diffusion structure 25 may be provided to the surface of the light-diffusion member 23 facing the heat-transfer member 22 only. In this case, the surface of the light-diffusion member 23 facing the liquid-crystal panel 21 may be flat. However, it is preferable that the surface of the light-diffusion member 23 facing the liquid-crystal panel 21 is subjected to adherence suppression treatment. In other words, the light-diffusion member 23 preferably includes an adherence suppression structure at the surface thereof facing the liquid-crystal panel 21. The adherence suppression structure can be provided by roughing the surface of the light-diffusion member 23 facing the liquid-crystal panel 21 or coating it with resin in which fine particles are dispersed. Note that, the light-diffusion structure 25 may also serve as an adherence suppression structure.

For example, the optical system 40 does not require the prism sheet 42 provided that an amount of light outputted from the backlight 30 and striking the Fresnel lens 41 falls within an allowable range. The optical system 40 may include one or more additional Fresnel lenses between the Fresnel lens 41 and the backlight 30. Note that, the shape of the Fresnel lens 41 may not be limited particularly. The optical system 40 may not necessarily include the Fresnel lens 41. Use of the optical system 40 may not be limited to divergence of light. For example, the optical system 40 may be used for convergence of light from the backlight 30. In one example, the optical system 40 may include at least one of a condenser lens and a field lens. The configuration of the optical system 40 may be modified appropriately in accordance with properties of light from the backlight 30. Or, the display system 110 may not include the optical system 40.

For example, outer shapes of components of the display (20; 20A; 20B) may not be limited particularly. In one example, the outer shapes of the liquid-crystal panel (21; 21A), the heat-transfer member (22; 22B), and the light-diffusion member 23 may not be necessarily rectangular, but may be circular or polygonal such as square.

For example, regarding the projection unit 120, shapes of the first optical member 121 and the second optical member 122 can be modified. For example, the shapes of the first optical member 121 and the second optical member 122 can have appropriate shapes in accordance with the display screen 21a.

For example, the image projection system 10 may not be limited to a configuration of forming the virtual image 310 in the target space 400 set in front of the automobile 100 in relation to a moving direction thereof. However, the image projection system 10 may form the virtual image 310 beside, behind, or over the automobile 100 in relation to the moving direction thereof, for example. The projection unit 120 may include a relay optical system for forming an intermediate image but may not include such a relay optical system.

For example, the image projection system 10 may apply to not only a head-up display used in the automobile 100 but also a movable object other than the automobile 100, such as a bicycle, a train, an aircraft, a construction machine, a boat and a ship. The image projection system 10 may not be limited to being used in movable objects but may be used in amusement facilities.

3. Aspects

As obviously understood from the embodiments and variations, the present disclosure contains the following aspects. In the following, the reference signs in parentheses are introduced in order to clearly indicate relation between the aspects and the embodiment and variations.

A first aspect is a display (20; 20A; 20B) including: a liquid-crystal panel (21; 21A); a heat-transfer member (22; 22B); and a light-diffusion structure (25). The liquid-crystal panel (21; 21A) includes a display screen (21a). The heat-transfer member (22; 22B) is light-transmissive and is on an opposite side of the liquid-crystal panel (21; 21A) from the display screen (21a). The light-diffusion structure (25) is between the liquid-crystal panel (21; 21A) and the heat-transfer member (22; 22B). Accordingly, the first aspect is capable of improving heat dissipation and uniformity and additionally improving image quality.

A second aspect is a display (20) which would be realized in combination with the first aspect. In the second aspect, the display (20) further includes a light-diffusion member (23) between the liquid-crystal panel (21) and the heat-transfer member (22). The light-diffusion member (23) includes the light-diffusion structure (25a, 25b). According to the second aspect, it can be easy to provide the light-diffusion structure (25a, 25b).

A third aspect is a display (20) which would be realized in combination with the second aspect. In the third aspect, the light-diffusion structure (25a) is provided to a surface of the light-diffusion member (23) facing the liquid-crystal panel (21). Accordingly, the third aspect is capable of improving heat dissipation and uniformity and additionally improving image quality.

A fourth aspect is a display (20) which would be realized in combination with the second aspect. In the fourth aspect, the light-diffusion structure (25b) is provided to a surface of the light-diffusion member (23) facing the heat-transfer member (22). Accordingly, the fourth aspect is capable of improving heat dissipation and uniformity and additionally improving image quality.

A fifth aspect is a display (20) which would be realized in combination with the fourth aspect. In the fifth aspect, the light-diffusion member (23) includes an adherence suppression structure at a surface thereof facing the liquid-crystal panel (21). Accordingly, the fifth aspect is capable of improving heat dissipation and uniformity and additionally improving image quality.

A sixth aspect is a display (20) which would be realized in combination with the second aspect. In the sixth aspect, the light-diffusion structure (25a, 25b) is provided to each of a surface of the light-diffusion member (23) facing the liquid-crystal panel (21) and a surface of the light-diffusion member (23) facing the heat-transfer member (22). Accordingly, the sixth aspect is capable of improving heat dissipation and uniformity and additionally improving image quality.

A seventh aspect is a display (20) which would be realized in combination with any one of the second to sixth aspects. In the seventh aspect, the heat-transfer member (22) and the light-diffusion member (23) have plate shapes. The light-diffusion member (23) is thinner than the heat-transfer member (22). Accordingly, the seventh aspect is capable of further improving heat dissipation.

An eighth aspect is a display (20) which would be realized in combination with any one of the second to seventh aspects. In the eighth aspect, the light-diffusion member (23) has a transmittance equal to or larger than 70%. The light-diffusion member (23) has haze equal to or larger than 30% and equal to or smaller than 90%. Accordingly, the eighth aspect allows a lighting performance of the display (20) to easily satisfy requirements for head-up displays.

A ninth aspect is a display (20) which would be realized in combination with the seventh or eighth aspect. In the ninth aspect, the light-diffusion member (23) has a thickness equal to or smaller than 300 μm. Accordingly, the ninth aspect is capable of improving heat dissipation.

A tenth aspect is a display (20; 20A; 20B) which would be realized in combination with any one of the first to eighth aspects. In the tenth aspect, the light-diffusion structure (25) includes a plurality of fine particles. An average particle size of the plurality of fine particles is equal to or smaller than 20 μm. Accordingly, the tenth aspect is capable of improving heat dissipation.

An eleventh aspect is a display (20) which would be realized in combination with the seventh or eighth aspect. In the eleventh aspect, the light-diffusion member (23) has a thickness equal to or smaller than 300 μm. The light-diffusion structure (25) includes a plurality of fine particles. An average particle size of the plurality of fine particles is equal to or smaller than 20 μm. Accordingly, the eleventh aspect is capable of improving heat dissipation.

A twelfth aspect is a display (20A) which would be realized in combination with any one of the first to eleventh aspects. In the twelfth aspect, the light-diffusion structure (25c) is provided to a surface of the liquid-crystal panel (21A) opposite from the display screen (21a). According to the twelfth aspect, it can be easy to provide the light-diffusion structure (25c).

A thirteenth aspect is a display (20A) which would be realized in combination with the twelfth aspect. In the thirteenth aspect, the light-diffusion structure (25c) is in contact with the heat-transfer member (22). Accordingly, the thirteenth aspect is capable of improving heat dissipation.

A fourteenth aspect is a display (20B) which would be realized in combination with any one of the first to thirteenth aspects. In the fourteenth aspect, the light-diffusion structure (25d) is provided to a surface of the heat-transfer member (22B) facing the liquid-crystal panel (21). According to the fourteenth aspect, it can be easy to provide the light-diffusion structure (25d).

A fifteenth aspect is a display (20B) which would be realized in combination with the fourteenth aspect. In the fifteenth aspect, the light-diffusion structure (25d) is in contact with the liquid-crystal panel (21). Accordingly, the fifteenth aspect is capable of improving heat dissipation.

A sixteenth aspect is a display (20; 20A; 20B) which would be realized in combination with any one of the first to fifteenth aspects. In the sixteenth aspect, the display (20; 20A; 20B) further includes a heat sink (24) thermally coupled with the heat-transfer member (22; 22B). Accordingly, the sixteenth aspect is capable of further improving heat dissipation.

A seventeenth aspect is a display (20; 20A; 20B) which would be realized in combination with the sixteenth aspect. In the seventeenth aspect, the heat-transfer member (22) has a thermal-conductivity higher than a thermal-conductivity of the liquid-crystal panel (21). Accordingly, the seventeenth aspect is capable of improving heat dissipation.

An eighteenth aspect is a display system (110; 110A; 110B) including: a display (20; 20A; 20B) according to any one of the first to seventeenth aspects; and a backlight (30). Accordingly, the eighteenth aspect is capable of improving heat dissipation and uniformity and additionally improving image quality.

A nineteenth aspect is an image projection system (10) used as a head-up display, including: the display system (110; 110A; 110B) according to the eighteenth aspect; and a projection unit (120). The projection unit (120) is configured to form a virtual image (310) corresponding to an image displayed on the display screen (21a) of the display system (110; 110A; 110B), in a target space (400). Accordingly, the nineteenth aspect is capable of improving heat dissipation and uniformity and additionally improving image quality.

A twentieth aspect is a movable object (100) including: the display system (110; 110A; 110B) according to the eighteenth aspect; and a movable object body (100a) where the display system (110; 110A; 110B) is mounted. Accordingly, the twentieth aspect is capable of improving heat dissipation and uniformity and additionally improving image quality.

While various embodiments have been described herein above, it is to be appreciated that various changes in form and detail may be made without departing from the spirit and scope of the present disclosure presently or hereafter claimed.

The entire contents of Japanese Patent Application No. 2018-125448 mentioned above are incorporated by reference.

What is claimed is:

1. A head-up display comprising:
   a liquid-crystal panel including a display screen;
   a Fresnel lens disposed below the display screen;
   a light-diffusion structure disposed below the liquid-crystal panel and above the Fresnel lens; and
   a mirror that forms a virtual image corresponding to an image displayed on the display screen of the liquid-crystal panel, in a target space, wherein
   the light-diffusion structure is thinner than the Fresnel lens; and
   the light-diffusion structure has a thickness equal to or smaller than 300 µm.

2. The head-up display according to claim 1, further comprising:
   a backlight that emits light toward the Fresnel lens.

3. The head-up display according to claim 1, wherein the light-diffusion structure has a transmittance equal to or larger than 70%.

4. The head-up display according to claim 1, wherein the light-diffusion structure includes a plurality of fine particles, and
   an average particle size of the plurality of fine particles is equal to smaller than 20 µm.

5. The head-up display according to claim 1, wherein the light-diffusion structure is in contact with the liquid-crystal panel.

6. The head-up display according to claim 2, further comprising:
   a light-transmissive member between the Fresnel lens and the backlight.

7. The head-up display according to claim 6, wherein the light-transmissive member is thinner than the Fresnel lens.

8. The head-up display according to claim 2, further comprising:
   a heat sink accommodating the Fresnel lens and the backlight.

9. The head-up display according to claim 8, wherein the heat sink has a plurality of fins protruding from an outer surface of the heat sink.

10. The head-up display according to claim 8, wherein the heat sink is made of aluminum.

11. The head-up display according to claim 2, wherein a surface of the Fresnel lens facing the backlight is uneven.

12. The head-up display according to claim 2, wherein light emitted from the backlight diverges in a direction toward the Fresnel lens.

13. The head-up display according to claim 2, wherein light emitted from the backlight converges in a direction toward the Fresnel lens.

14. The head-up display according to claim 2, wherein the backlight includes light emitting diodes or laser diodes.

15. The head-up display according to claim 1, wherein the Fresnel lens is made of glass or resin.

* * * * *